United States Patent
Tsuji et al.

(10) Patent No.: US 7,071,609 B2
(45) Date of Patent: Jul. 4, 2006

(54) RED PHOSPHOR FOR LOW-VOLTAGE ELECTRON BEAM

(75) Inventors: Hitoshi Tsuji, Ise (JP); Satoshi Okada, Ise (JP); Hitomi Kitamura, Ise (JP)

(73) Assignees: Noritake Itron Corporation, Ise (JP); Noritake Co. Ltd., Aichi (JP)

( * ) Notice: Subject to any disclaimer, the term of this patent is extended or adjusted under 35 U.S.C. 154(b) by 86 days.

(21) Appl. No.: 10/842,372

(22) Filed: May 10, 2004

(65) Prior Publication Data

US 2004/0227451 A1 Nov. 18, 2004

(30) Foreign Application Priority Data

May 12, 2003 (JP) .......................... P2003-132584

(51) Int. Cl.
*H01J 1/62* (2006.01)
*H01J 63/04* (2006.01)

(52) U.S. Cl. ..................... 313/496; 313/495; 313/497

(58) Field of Classification Search ........ 313/495–497, 313/467; 252/301.4 R, 301.6 R, 301.6 F, 252/301.4 S, 301.4 F
See application file for complete search history.

(56) References Cited

U.S. PATENT DOCUMENTS

| | | | |
|---|---|---|---|
| 3,664,862 A * | 5/1972 | Kinglsey et al. ...... | 252/301.6 F |
| 4,275,333 A * | 6/1981 | Kagami et al. ............. | 313/495 |
| 5,369,331 A * | 11/1994 | Mizukami et al. .......... | 313/467 |
| 5,619,098 A * | 4/1997 | Toki et al. .................. | 313/496 |
| 5,958,296 A * | 9/1999 | Do et al. ............... | 252/301.4 R |
| 6,333,122 B1 * | 12/2001 | Furukawa et al. .......... | 428/690 |
| 6,373,184 B1 * | 4/2002 | Suh et al. .................. | 313/486 |
| 6,882,099 B1 * | 4/2005 | Yamaguchi et al. ........ | 313/495 |

FOREIGN PATENT DOCUMENTS

| | | | |
|---|---|---|---|
| JP | 08-085788 | | 4/1996 |
| JP | 08-283709 | | 10/1996 |
| JP | 08283709 A | * | 10/1996 |
| JP | 09-087618 | | 3/1997 |
| JP | 09-255952 | | 9/1997 |
| JP | 2746186 | | 2/1998 |
| JP | 10-261371 | | 9/1998 |
| JP | 10-273658 | | 10/1998 |
| JP | 10-279933 | | 10/1998 |
| JP | 2904106 | | 3/1999 |
| JP | 2004-0075907 | | 3/2004 |
| JP | 2004-0075908 | | 3/2004 |

* cited by examiner

*Primary Examiner*—Joseph Williams
*Assistant Examiner*—Kevin Quarterman
(74) *Attorney, Agent, or Firm*—James V. Costigan; Hedman & Costigan

(57) ABSTRACT

To provide a red phosphor red phosphor, for low-voltage electron beams, excellent in the life characteristic of its emission luminance and phosphors, for low-voltage electron beams, emitting light in various colors, the red phosphor containing $SrTiO_3$:Pr, Al as a main component thereof is mixed an inorganic compound comprises sulfides. The inorganic compound is a sulfide or a sulfide-containing phosphor. The inorganic compound is a sulfide of alkaline earth metals.

11 Claims, 6 Drawing Sheets

RED PHOSPHOR FOR LOW-VOLTAGE ELECTRON BEAM

This nonprovisional application claims priority under 35 U.S.C. § 119(a) on Patent Application No 2003-132584, filed in Japan on May 12, 2003, the entire contents of which are hereby incorporated by reference.

BACKGROUND OF THE INVENTION

The present invention relates to a red phosphor for low-voltage electron beams and more particularly to a red phosphor, for low-voltage electron beams, using a red phosphor ($SrTiO_3$:Pr, Al).

A vacuum fluorescent display is frequently used as a self-emission type display for displaying a predetermined pattern or graphic design on a display portion of an audio system, a household appliance, a measuring instrument, a medical appliance, and the like. The vacuum fluorescent display is also used as light sources of a back-light, a printer head, a facsimile, a copying apparatus, and the like.

Of phosphors for use in these vacuum fluorescent displays, conventional red phosphors ((Zn, Cd) S:Ag, Cl) contain cadmium (Cd). To preserve environment, the following red phosphors for low-voltage electron beams not containing Cd have been developed in recent years: the phosphor (U.S. Pat. No. 2,746,186) composed of the phosphor component containing the oxide of titanium (Ti) and one element selected from among magnesium (Mg), strontium (Sr), calcium (Ca), and barium (Ba) asitsmatrix to which the group III element is added and the protection film, consisting of the oxide, for protecting the phosphor component from a carbon-containing gas; the phosphor (U.S. Pat. No. 2,904,106) in which at least one substance, selected from $PtO_2$ and/or $RuO_2$, is added to the phosphor component containing $SrTiO_3$ as its matrix; the phosphor (Japanese Patent Application Laid-Open No. 2004-75907) in which the surface of the phosphor component containing $SrTiO_3$ as its matrix is coated with the conductive oxide, and the oxide of the platinum group is spread over the surface of the conductive oxide; the phosphor (Japanese Patent Application Laid-Open No. 2004-75908) containing zeolite particles; the phosphor (Japanese Patent Application Laid-Open No. 8-85788) in which the rare earth element and the group III element are added the matrix consisting of the oxide of the alkaline earth metal and Ti; the phosphor (Japanese Patent Application Laid-Open No. 8-283709) in which the protection film is formed on the surface of the matrix consisting of the alkaline earth metal and the oxide; the phosphor (Japanese Patent Application Laid-Open No. 9-87618) in which the high-resistant phosphor component and the low-resistant phosphor component are mixed with each other to allow emission owing to a collision of electrons accelerated at an anode voltage not more than 2 kV; the phosphor (Japanese Patent Application Laid-Open No. 9-255952) in which the substance, having an oxidizing action, is added to the phosphor component having $SrTiO_3$ as its matrix; the phosphor (Japanese Patent Application Laid-Open No. 10-261371) in which the diamond-liked carbon film is formed on the surface of the phosphor component containing $SrTiO_3$ as its matrix; the phosphor (Japanese Patent Application Laid-Open No. 10-279933) in which the group 4b element is added to the phosphor component containing $SrTiO_3$ as its matrix; and the phosphor (Japanese Patent Application Laid-Open No. 10-273658) in which the phosphor component containing $SrTiO_3$ as its matrix is coated with the film consisting of the substance containing Si except $SiO_2$.

However, $SrTiO_3$:Pr, Al serving as the red phosphor, for low-voltage electron beams, not containing Cd reduces at a high rate in its luminance with the passage of time and thus has a short life. In an operation environment in which an excitation voltage exceeds 15V, the life of the phosphor becomes extremely short.

Although the life of the phosphor can be prolonged a little by forming the protection film consisting of the oxide on the phosphor component or adding $PtO_2$ or the like to the phosphor component, the life of the phosphor is not so long as to be practically used. The life of a mixed type phosphor using $SrTiO_3$: Pr, Al for low-voltage electron beams, is not so long as to be practically used, the mixed type phosphors cause easily color changing and a light emitting unevenness, because the life of $SrTiO_3$: Pr, Al is short.

SUMMARY OF THE INVENTION

The present invention has been made in view of the above-described problems. Therefore it is an object of the present invention to provide a red phosphor, for low-voltage electron beams, excellent in the life characteristic of its emission luminance, even though $SrTiO_3$: Pr, Al is used for the red phosphor. It is another object of the present invention to provide stable mixed type phosphors, for low-voltage electron beams, using the red phosphor and do not cause easily color changing and a light emitting unevenness.

To solve the above-described problems, in the present invention, the red phosphor for low-voltage electron beams containing $SrTiO_3$:Pr, Al as a main component thereof is mixed an inorganic compound comprises a sulfide.

The inorganic compound is a sulfide and/or a sulfide-containing phosphor.

The sulfide is a sulfide of the alkaline earth metal, zinc sulfide or $Y_2O_2S$.

The sulfide-containing phosphor is a green phosphor containing ZnS:Cu, Al as a main component thereof or a blue phosphor containing ZnS:Cl as a main component thereof.

The phosphor of the present invention contains a conductive oxide.

The inorganic compound including the sulfide in the present invention comprises sulfides alone, oxysulfide alone, sulfide-containing phosphor, mixed compounds thereof and other mixed-compounds consisting of other inorganic compounds and sulfides alone, oxysulfide alone, sulfide-containing phosphor, or mixed compounds thereof.

The multi-color phosphors having a neutral color between two phosphors, of the present invention, for low-voltage electron beams are formed by mixing the red phosphor containing $SrTiO_3$:Pr, Al as its main component with the inorganic compound comprises the sulfide. Therefore it is possible to obtain a vacuum fluorescent display having along life and a constant display quality. It is also possible to obtain multi-color phosphors not containing Cd by mixing the red phosphor and the sulfide-containing phosphor.

DETAILED DESCRIPTION OF THE PREFERRED EMBODIMENTS

The present inventors have studied the cause of the lowering of the emission luminance of a red phosphor ($SrTiO_3$:Pr, Al) for low-voltage electron beams excellent in the color purity of red and not containing cadmium (Cd) with the passage of time. As a result, they have found that barium oxide composing the cathode material deposits scatteringly on the surface of the red phosphor and is then decomposed by being irradiated with electron beams to generate barium ions and that the barium ions reduce and modify the red phosphor. That is, the barium oxide which has scattered from the cathode material and deposited on the surface of the red phosphor is decomposed into the barium ions by being irradiated with electron beams, as shown by the following formula (1):

$BaO \rightarrow Ba^{2+}+O^{2-}$      Formula (1)

The red phosphor ($SrTiO_3$:Pr, Al) is reduced and modified by the barium ions ($Ba^{2+}$), as shown by the following formula (2):

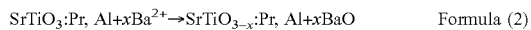

$SrTiO_3$:Pr, Al+$xBa^{2+} \rightarrow SrTiO_{3-x}$:Pr, Al+$x$BaO      Formula (2)

By mixing an inorganic compound, for example, ZnS or CaS generating sulfur by being irradiated with the electron beams with the red phosphor containing $SrTiO_3$:Pr, Al as its main component, sulfur is decomposed from the inorganic compound by being irradiated with the electron beams and scatters, as shown by the following formula (3):

$ZnS \rightarrow Zn+S\uparrow CaS \rightarrow Ca+S\uparrow$      Formula (3)

The generated sulfur reacts with a part of the barium oxide composing the cathode material, as shown by the following formula (4):

$BaO+S \rightarrow BaS+½O_2$ or BaOS      Formula (4)

Since the generated BaS or BaOS evaporate slower than BaO, a smaller amount of BaO scatters on the red phosphor. Consequently it is possible to prevent $SrTiO_3$:Pr, Al from being reduced and modified. Thereby it is possible to prevent the luminance of the red phosphor from deteriorating.

The present inventors have also found that by using the inorganic compound comprises a sulfide, it is possible to improve the life characteristic of the emission luminance of the red phosphor without hardly affecting an emission from the cathode material. In obtaining a compound color by mixing the red phosphor and a green phosphor or a blue phosphor, the use of the green phosphor or the blue phosphor containing the sulfide makes it possible to obtain mixed type phosphors, each emitting a color, superior in the life characteristic of the emission luminance although $SrTiO_3$:Pr, Al is used for the red phosphor.

Figure 4:
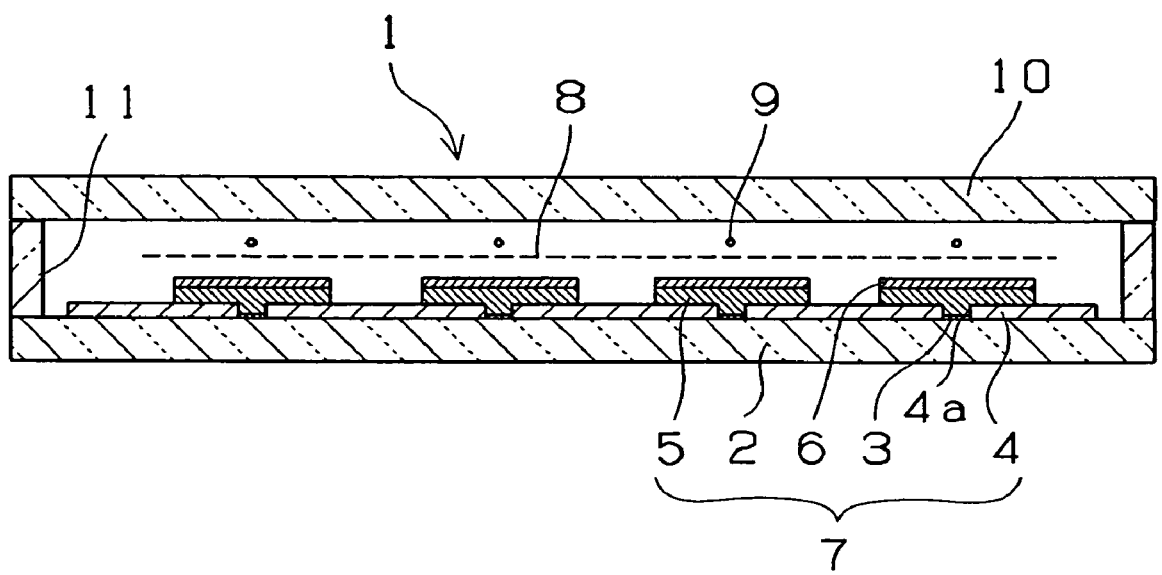
FIG. 4 is a sectional view showing a vacuum fluorescent display.
Figure 5:
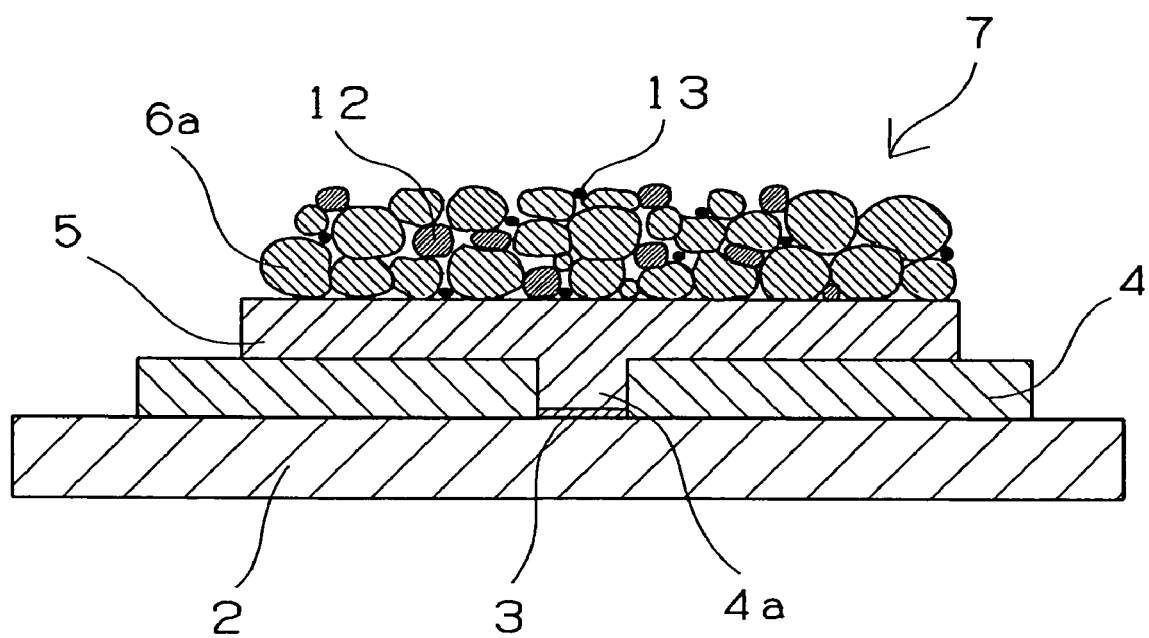
FIG. 5 is a partly enlarged sectional view showing an anode substrate formed by mixing a red phosphor and a sulfide with each other.
Figure 6:
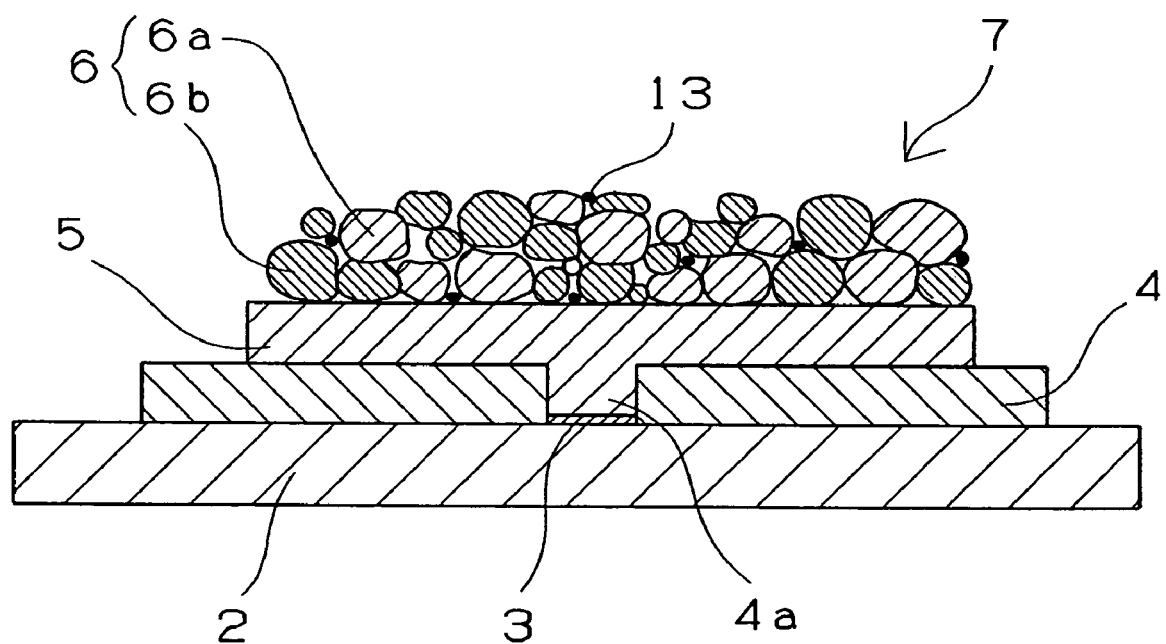
FIG. 6 is a partly enlarged sectional view showing an anode substrate formed by mixing the red phosphor and a sulfide-containing phosphor with each other.

An example of a vacuum fluorescent display using the phosphor, of the present invention, for low-voltage electron beams is described below with reference to FIGS. 4 through 6. FIG. 4 is a sectional view showing the vacuum fluorescent display. FIGS. 5 and 6 are a partly enlarged sectional view showing an anode substrate constituting the vacuum fluorescent display.

A vacuum fluorescent display 1 includes an anode substrate 7, a grid 8, and a cathode 9. The grid 8 and the cathode 9 are disposed over the anode substrate 7. A face glass 10 and a spacer glass 11 are used to enclose these component parts by applying low melting flit glass, in the vacuum fluorescent display 1 and evacuate the air therein. Low-voltage electron beams generated by the cathode 9 are emitted to a phosphor layer 6 formed on an anode substrate 7 to allow the phosphor to emit light.

The cathode 9 is constructed as follows: A carbonate (Ba, Sr, Ca) $CO_3$ of the alkaline earth metal and a binder are electrodeposited to a tungsten filament to form (Ba, Sr, Ca) O by decomposition of carbonates at 1000° C. in vacuum at a final stage in the assembling of the vacuum fluorescent display 1. An electron beam emission source is composed of BaO, a part of which is reduced and activated on the super-fine wire made of tungsten. The electron beam emission source contains a proper amount of SrO and CaO to stabilize BaO.

As shown in FIGS. 5 and 6, the anode substrate 7 is formed as follows: A wiring layer 3 is formed on a glass substrate 2 by applying a conductive paste to the glass substrate 2 by using a printing method or by patterning a thin film of aluminum with photolithography process on the glass substrate 2 formed by a thin film-forming method. Thereafter an insulation layer 4 is formed on almost the entire surface of the glass substrate 2 except a through-hole 4a by applying flit glass paste having a low melting point by using the printing/applying method. Thereafter an anode electrode 5 electrically connected with the wiring layer 3 through the through-hole 4a is formed by applying graphite paste to the insulation layer 4 and the wiring layer 3 by using the printing/applying method. After a phosphor layer 6 is applied to the anode electrode 5 by using the printing/applying method, a calcining process is performed. Thereby the anode substrate 7 is obtained. A conductive oxide 13 can be mixed in the phosphor layer 6.

The phosphor layer 6 shown in FIG. 5 is composed of a red phosphor 6a containing $SrTiO_3$: Pr, Al as its main component, a sulfide 12, and a conductive oxide 13.

The phosphor layer 6 shown in FIG. 6 is composed of the red phosphor 6a containing $SrTiO_3$:Pr, Al as its main component and a sulfide-containing phosphor 6b. As the sulfide-containing phosphor 6b, a green phosphor containing ZnS: Cu, Al as its main component or a blue phosphor containing ZnS:Cl as its main component are available.

The red phosphor 6a, for low-voltage electron beams, which can be used in the present invention is composed of particles of $SrTiO_3$:Pr, Al serving as its matrix and activated Pr and Al added thereto. The red phosphor may consist of $SrTiO_3$:Pr, Al. A part of Sr can be replaced with Ca within the range in which the chromaticity of the red phosphor can be maintained. The activated substance may consist of a mixture of at least one element selected from among Ce, Pr, Eu, Tb, Er, and Tm and at least one element selected from Al, Ga, In, and Tl. The red phosphor consisting of $SrTiO_3$:Pr, Al is preferable.

Sulfides and oxysulfides are available as the inorganic compound generating sulfur when it is irradiated with electron beams. A preferable inorganic compound is a sulfide frequently used as the matrix of the phosphor.

As the sulfide which can be used in the present invention, compounds of sulfur and elements more positive than the sulfur and oxysulfides are available.

Sulfides of the alkaline earth metals are preferable as the sulfide which can be used in the present invention. It is possible to use magnesium sulfide (MgS), calcium sulfide (CaS), strontium sulfide (SrS), and barium sulfide (BaS). These sulfides can be used singly or as a mixture thereof. Because the sulfides of the alkaline earth metals have strong ionic-bonding property, they are not decomposed excessively when they are irradiated with electron beams and hence contribute to maintenance of the luminance of the phosphor and reduction in deterioration of the characteristic of the cathode for long time.

As other sulfides which can be used in the present invention, ZnS is available. As the oxysulfides which can be used in the present invention, $Y_2O_2S$ and $Ga_2O_2S$ are available. ZnS is preferable because it can be readily decomposed by being irradiated with low-voltage electron beams.

It is preferable that the mixing ratio of the sulfide is in the range of 0.5 to 20 wt % for the total weight of the red phosphor and the sulfide. If the mixing ratio of the sulfide is less than 0.5 wt %, BaS or BaOS is formed in an insufficient amount on the cathode. Thus it is impossible to suppress the deterioration of the luminance of the phosphor. If the mixing ratio of the sulfide is more than 20 wt %, the cathode deteriorates too greatly.

In the present invention, the sulfide-containing phosphor can be used instead of the above-described sulfides.

As the sulfide-containing phosphor, ZnS:Cl; ZnS:Cu, Al; and CaS:Eu are available.

Mixing the sulfide-containing phosphor with the red phosphor ($SrTiO_3$:Pr, Al) for low-voltage electron beams provides mixed phosphors each emitting light in a intermediate color and contributes to dramatic prolongation of the life of $SrTiO_3$:Pr, Al.

Figure 1:
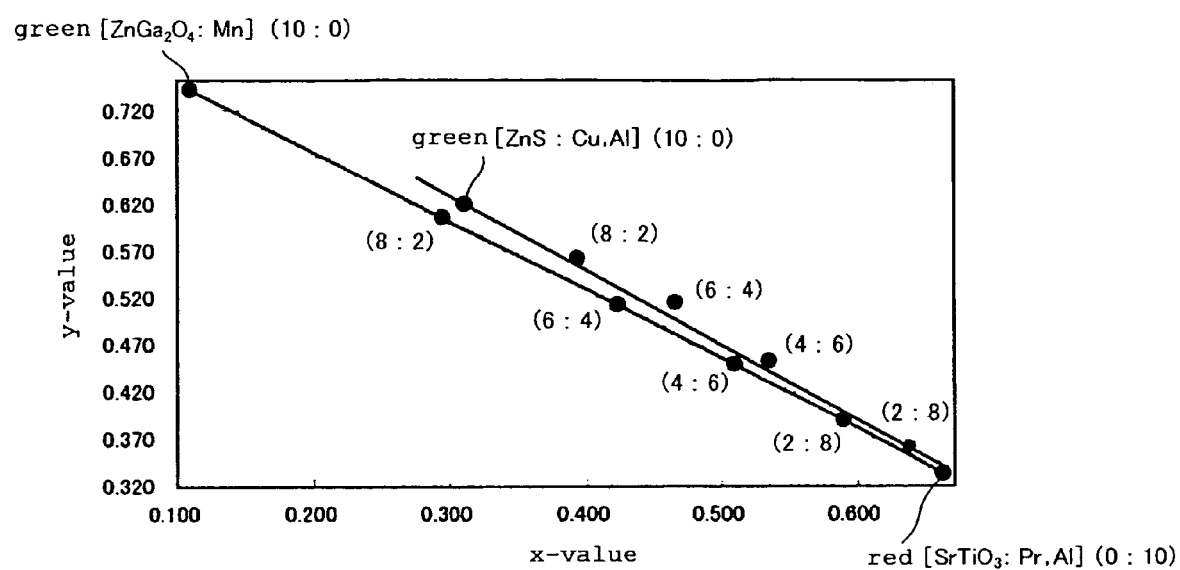
FIG. 1 shows an x-value and a y-value of mixed phosphors in a CIE chromaticity coordinate.

As an example of the mixing sulfide-containing phosphor with the red phosphor ($SrTiO_3$:Pr, Al), FIG. 1 shows an x-value and a y-value of phosphors obtained by mixing the green phosphor (ZnS:Cu, Al) with the red phosphor ($SrTiO_3$: Pr, Al) in a CIE chromaticity coordinate.

The numerical values in the parentheses of FIG. 1 indicate mixing weight ratios between ZnS:Cu, Al and $SrTiO_3$:Pr, Al.

In comparison with the phosphors obtained by mixing the red phosphor ($SrTiO_3$:Pr, Al) and the green phosphor (ZnS: Cu, Al) with each other, FIG. 1 also shows phosphors obtained by mixing a green phosphor ($ZnGa_2O_4$:Mn) not containing a sulfide with $SrTiO_3$:Pr, Al at mixing weight ratios shown in the parentheses.

As shown in FIG. 1, the phosphors obtained by mixing the green phosphor (ZnS:Cu, Al) and the red phosphor ($SrTiO_3$: Pr, Al) with each other emitted red, orange, yellow, and green respectively equally to the phosphors obtained by mixing the green phosphor ($ZnGa_2O_4$: Mn) not containing the sulfide with red phosphor ($SrTiO_3$:Pr, Al).

Figure 2:
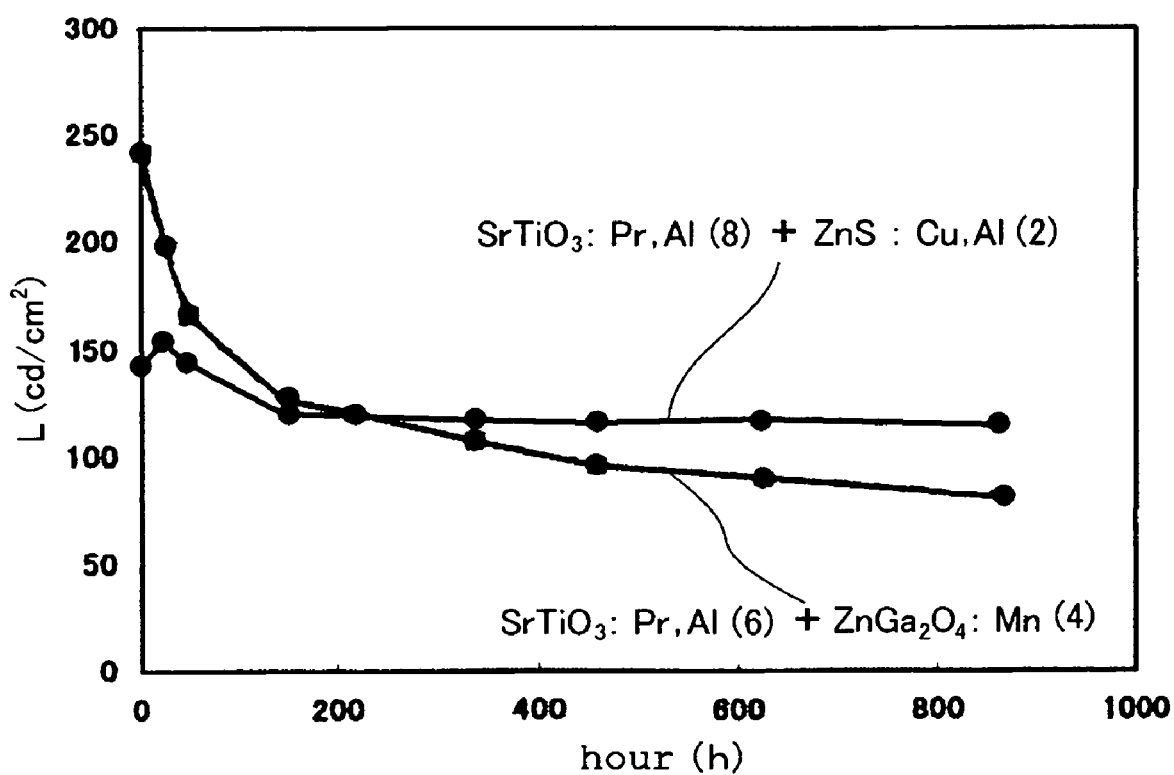
FIG. 2 shows the change of the luminance of mixed phosphors with time.
Figure 3:
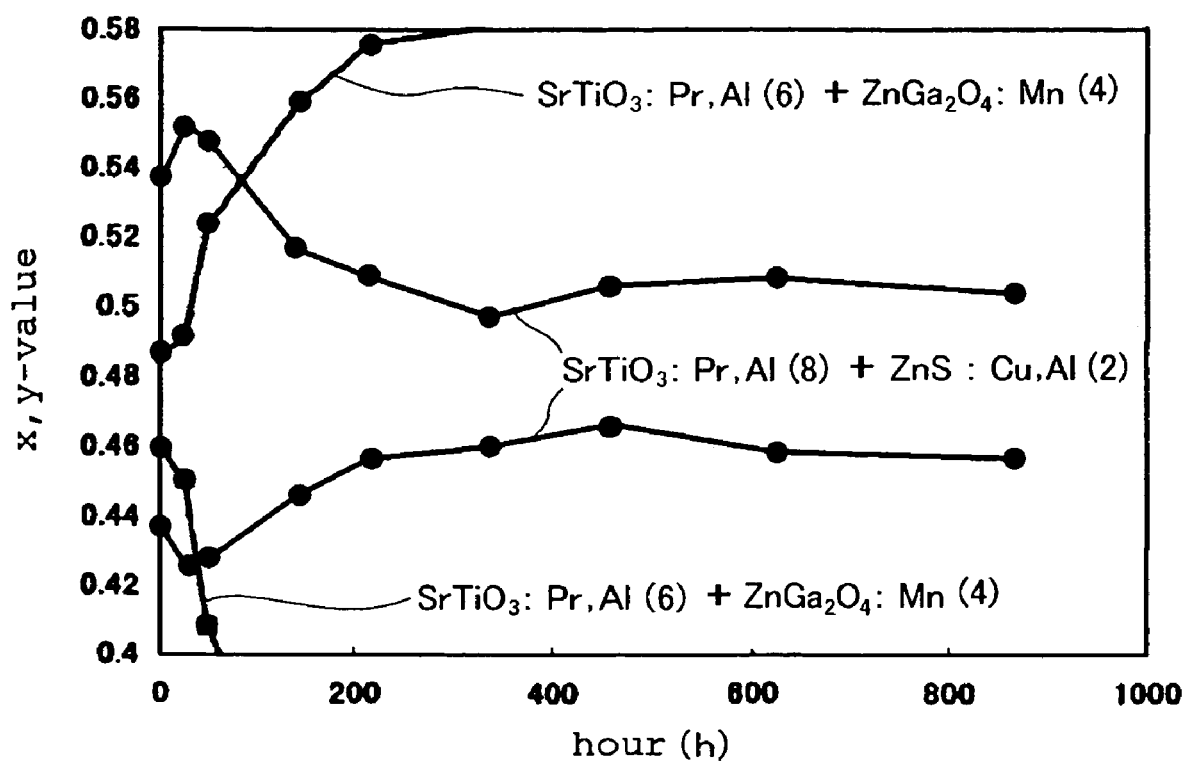
FIG. 3 shows the change of x-values and y-values of the phosphors with time.

FIGS. 2 and 3 show results of measurement of the life characteristic of the phosphor obtained by mixing ZnS:Cu, Al with $SrTiO_3$:Pr, Al at a mixing ratio 2:8 and the phosphor obtained by mixing $ZnGa_2O_4$:Mn with $SrTiO_3$:Pr, Al at a mixing ratio 4:6. FIG. 2 shows the change of the luminance of each mixed phosphor with time. FIG. 3 shows the change of the x-value and the y-value of each mixed phosphor with time.

To examine the life characteristics of the phosphors, vacuum fluorescent displays were assembled from the mixed phosphors. To this end, the change of the luminance and chromaticity of each mixed phosphor with time were measured at an anode electrode of 50V and a duty of 1/60.

As shown in FIG. 2, $SrTiO_3$:Pr, Al mixed with the sulfide-containing phosphor had an initial luminance of 150 $cd/cm^2$. The luminance after elapse of about 900 hours was 120 $cd/cm^2$ which was about 80% of 150 $cd/cm^2$.

$SrTiO_3$:Pr, Al mixed with the phosphor not containing the sulfide had an initial luminance of 250 $cd/cm^2$. The luminance after elapse of about 900 hours was 80 $cd/cm^2$ which was bout 30% of 250 $cd/cm^2$.

As shown in FIG. 3, even after elapse of about 900 hours, $SrTiO_3$:Pr, Al mixed with the sulfide-containing phosphor had not more than ±10% in its chromaticity change indicated by the change of the x-value and the y-value. That is, the mixed phosphor had little change in its chromaticity and luminous maintenance.

On the other hand, after elapse of about 400 hours, $SrTiO_3$:Pr, Al mixed with the phosphor not containing the sulfide had not less than ±30% in its chromaticity change. That is, the mixed phosphor had a great change in its chromaticity. As shown in FIGS. 2 and 3, $SrTiO_3$: Pr, Al mixed with the sulfide-containing phosphor showed a life characteristic superior to $SrTiO_3$:Pr, Al mixed with the phosphor not containing the sulfide.

A coating layer may be formed on the surface of the red phosphor ($SrTiO_3$:Pr, Al). For example, a compound layer containing Li as its main component may be formed on the surface of the red phosphor. In addition, a plurality of layers may be formed on the surface of the red phosphor. That is, a layer made of an oxide of Sn and/or Sb may be formed on an oxide layer made of Si and/or Ti formed on the surface of the red phosphor.

It is preferable to mix a conductive oxide with the mixture of the red phosphor ($SrTiO_3$:Pr, Al) and the sulfide or with the mixture of the red phosphor ($SrTiO_3$:Pr, Al) and the sulfide-containing phosphor. As the conductive oxide, oxides of Sn, Ti, Zn, W, In or Nb or composite conductive oxides are available. It is preferable to use $SnO_2$, $TiO_2$, ZnO, $WO_3$, $In_2O_3$, and ITO as the conductive oxide. By mixing the conductive oxide with the mixed phosphors, they are provided with conductivity for preventing charge-up of electron beams incident thereon.

It is preferable that the conductive oxide is mixed with the mixed phosphor in the range of 5 to 20 wt % for the total weight of the mixed phosphor and the conductive oxide. If the mixing amount of the conductive oxide is less than 5 wt %, a sufficient conductivity cannot be imparted to the mixed phosphors. Even if the mixing amount of the conductive oxide is more than 20 wt %, the conductivity thereof cannot be improved to a higher extent and the luminance thereof is liable to lower.

The red phosphor of the present invention containing $SrTiO_3$: Pr, Al as its main component is prepared by mixing it with the sulfide or the sulfide-containing phosphor. The anode substrate can be formed from the phosphor by using a printing method or the like.

For example, the printing paste contains a binder resin in which the red phosphor for low-voltage electron beams and the sulfide or the sulfide-containing phosphor are dispersed. As the binder resin, ethyl cellulose excellent in printing performance can be used.

The anode substrate is obtained by performing the stage of printing the printing paste on an anode pattern, a drying stage, and a calcining stage.

EXAMPLES 1 THROUGH 7 AND COMPARISON EXAMPLE 1

Phosphors for low-voltage electron beams were obtained by mixing the red phosphor ($SrTiO_3$:Pr, Al) having an average particle diameter of 2 to 3 μm, the sulfide shown in table 1, and the conductive oxide shown in table 1 with one another at ratios shown in table 1. ZnS used as the sulfide had an average diameter of 4 to 6 μm. $Y_2O_2S$ also used as the sulfide had an average diameter of 4 to 6 μm. CaS also used as the sulfide had an average diameter of 6 to 8 μm. SrS also used as the sulfide had an average diameter of 6 to 8 μm. $In_2O_3$ used as the conductive oxide had an average diameter of 0.1 to 0.2 μm.

The obtained phosphor particles were dispersed in a mixed solution of α-terpineol and ethyl cellulose to prepare the printing paste. Screen printing was carried out by using the printing paste. Then printing paste was fired at 530° C. to prepare anode substrates. Vacuum fluorescent displays were assembled from the anode substrates.

Each of the obtained vacuum fluorescent display was examined about its initial luminance, its initial luminance maintenance rate after elapse of about 5000 hours, and its cathode maintenance rate of emission ability at an anode voltage of 26V and a duty 1/12. Table 1 shows the results.

By using a method similar to that of the example 1, vacuum fluorescent displays were assembled from the anode substrate. By using a method similar to that of the example 1, each of the obtained vacuum fluorescent display was examined about its initial luminance and the like. Table 2 shows the results.

TABLE 1

|  | Example | | | | | | | Comparison example |
|---|---|---|---|---|---|---|---|---|
|  | 1 | 2 | 3 | 4 | 5 | 6 | 7 | 1 |
| Component (Phosphor:SrTiO3:Pr, Al) Sulfide (wt %) | | | | | | | | |
| ZnS | 2 | 10 | 18 | — | — | — | — | — |
| $Y_2O_2S$ | — | — | — | 18 | — | — | — | — |
| CaS | — | — | — | — | 10 | 18 | 5 | — |
| SrS | — | — | — | — | — | — | 5 | — |
| Conductive oxide (wt %) | | | | | | | | |
| $In_2O_3$ | 10 | 10 | 10 | 10 | 10 | 10 | 10 | 10 |
| Properties | | | | | | | | |
| Initial luminance (cd/cm²) | 300 | 250 | 200 | 200 | 250 | 200 | 280 | 300 |
| Luminance maintenance rate after elapse of 5000 hours | not less than 50% | not less than 70% | not less than 90% | not less than 50% | not less than 80% | not less than 90% | not less than 80% | not more than 5% |
| Cathode maintenance rate after elapse of 5000 hours | not less than 70% | not less than 60% | not less than 50% | not less than 70% | not less than 70% | not less than 60% | not less than 70% | not less than 70% |

As shown in table 1, the red phosphor ($SrTiO_3$:Pr, Al) of each example had an improved luminance maintenance rate because the red phosphor ($SrTiO_3$:Pr, Al) was mixed with the sulfide. On the other hand, the luminance maintenance rate of the red phosphor of the comparison example 1 was not more than 5% because the red phosphor was not mixed with the sulfide.

EXAMPLES 8 AND 9 AND COMPARISON EXAMPLE 2

Phosphors for low-voltage electron beams were obtained by mixing the red phosphor ($SrTiO_3$:Pr, Al) having an average particle diameter of 2 to 3 μm, the sulfide-containing phosphor shown in table 2, and the conductive oxide shown in table 2 with one another at ratios shown table 2.

TABLE 2

|  | Example | | Comparison example |
|---|---|---|---|
|  | 8 | 9 | 2 |
| Component (Phosphor:SrTiO3:Pr, Al) sulfide-containing phosphor (wt %) | | | |
| ZnS:Cu, Al | 20 | — | — |
| ZnS:Cl | — | 20 | — |
| $ZnGa_2O_4$:Mn | — | — | 40 |
| Conductive oxide (wt %) | | | |
| $In_2O_3$ | 10 | 10 | 10 |
| Properties | | | |
| Initial luminance (cd/cm²) | 150 | 150 | 250 |
| Luminance maintenance rate after elapse of 1000 hours | not less than 80% | not less than 80% | not more than 30% |
| Cathode maintenance rate after elapse of 1000 hours | not less than 50% | not less than 50% | less than 50% |

As shown in table 2, the phosphor which was a mixture of the red phosphor ($SrTiO_3$:Pr, Al) and the sulfide-containing phosphor had an improved luminance maintenance rate and little change in its chromaticity. On the other hand, the red phosphor of comparison example 2 which did not contain the sulfide-containing phosphor had a luminance maintenance rate not more than 30% and a high chromaticity change because the red phosphor deteriorated greatly.

What is claimed is:

1. A vacuum fluorescent display for allowing a phosphor to emit light by irradiating said phosphor formed on an anode substrate with low-voltage electron beams generated from a cathode, wherein said phosphor is a red phosphor for low-voltage electron beams comprising:
a red phosphor containing $SrTiO_3$:Pr, Al as a main component thereof; and
an inorganic compound comprising a sulfide.

2. A vacuum fluorescent display according to claim 1, wherein said sulfide is a sulfide of alkaline earth metals.

3. A vacuum fluorescent display according to claim 2, wherein said alkaline earth metals are a metal selected from a group consisting of magnesium, calcium, strontium, and barium.

4. A vacuum fluorescent display according to claim 1, wherein said sulfide is zinc sulfide.

5. A vacuum fluorescent display according to claim 1, wherein said sulfide is oxysulfide.

6. A vacuum fluorescent display according to claim 1, wherein said inorganic compound comprises a sulfide-containing phosphor.

7. A vacuum fluorescent display according to claim 6, wherein said sulfide-containing phosphor is a green phosphor containing ZnS:Cu, Al as a main component thereof.

8. A vacuum fluorescent display according to claim 6, wherein said sulfide-containing phosphor is a blue phosphor containing ZnS:Cl as a main component thereof.

9. A vacuum fluorescent display according to claim 1, wherein said inorganic compound is contained at 0.5 to 20 wt % for a total of a weight of said red phosphor and said inorganic compound.

10. A vacuum fluorescent display according to claim 1, wherein a conductive oxide is contained.

11. A vacuum fluorescent display according to claim 10, wherein said conductive oxide is contained at 5 to 20 wt % for a total of a weight of said red phosphor, said inorganic compound, and said conductive oxide.

* * * * *